United States Patent [19]

Cunningham

[11] 4,178,879

[45] Dec. 18, 1979

[54] RESTRAINING DEVICE FOR ANIMALS

[76] Inventor: Louise B. Cunningham, 1505 N. 22nd St., Corsicana, Tex. 75110

[21] Appl. No.: 836,483

[22] Filed: Sep. 26, 1977

[51] Int. Cl.² .......................... A01K 27/00; G09F 3/08
[52] U.S. Cl. ..................................... 119/106; 40/21C
[58] Field of Search ............ 119/106, 109; 40/10 D, 40/21 C, 300, 594, 595

[56] References Cited

U.S. PATENT DOCUMENTS

| 1,657,250 | 1/1928 | Fetters | 119/106 |
|---|---|---|---|
| 2,378,755 | 6/1945 | Dowling | 40/21 C |
| 2,510,224 | 6/1950 | Hettinger | 40/21 C |
| 2,648,150 | 8/1953 | Sullivan | 40/21 C X |
| 2,680,315 | 6/1954 | McHugh et al. | 119/106 X |
| 2,846,796 | 8/1958 | Polzin | 40/21 C |
| 2,861,547 | 11/1958 | Dale | 119/109 |
| 2,911,743 | 11/1959 | Pokras | 40/21 C |
| 3,440,746 | 4/1969 | Richards | 40/595 |
| 3,631,616 | 1/1972 | Hill | 40/21 C |
| 3,782,017 | 1/1974 | Graham | 40/303 |
| 3,889,411 | 6/1975 | Laugherty et al. | 40/21 C |

FOREIGN PATENT DOCUMENTS

1375195  11/1974  United Kingdom ................... 40/10 D

*Primary Examiner*—Louis G. Mancene
*Assistant Examiner*—Daniel J. Leach
*Attorney, Agent, or Firm*—Hubbard, Thurman, Turner, Tucker & Glaser

[57] ABSTRACT

An animal collar includes a flexible belt with a transparent face or window running along a substantial portion of the belt. A pouch is formed therein for containing a display strip having various identifying and ornamental indicia along one side which are displayed through the transparent face. A transverse slot is provided near one end of the pouch for inserting and removing the strip so that the indicia can be readily changed. A number of indicia-bearing tabs are provided having an adhesive backing for removable attachment to the side of the display strip.

10 Claims, 8 Drawing Figures

RESTRAINING DEVICE FOR ANIMALS

BACKGROUND AND SUMMARY OF THE INVENTION

This invention relates to improvements in restraining devices for animals and more specifically concerns animal collars or belts having means for identification or ornamentation.

Various animal collars, belts, leashes and harnesses have been made heretofore which include identification bands and various types of ornamentation for household pets and other animals. Typical collars of this type utilize some sort of metallic tag or other permanently impressed material for identification indicia such as the address of the owner. Such collars become useless in the event that the owner changes his address or the collar is to be placed on another animal requiring different identifying indicia.

Some collars have provided for a tag holder attachment having parts which can be disassembled to allow for a change of identifying indicia. Such holders are typically relatively small in comparison to the belt or collar so that very little information is permitted thereon. Moreover, the tags usually do not lie flush or integral with the collar making the tags susceptible to being snagged or caught, resulting in possible collar damage or pet strangulation.

Many pet owners also have an interest in using decorative and ornamental collars for their animals. Such collars are not widely available and are usually rather expensive. The owner is therefore greatly limited in his choice of ornamental collars, although it would be preferable to have a variety of ornamental collars available for different occasions.

The present invention is designed to overcome these and other objections and to improve the construction of restraining devices, such as collars, leashes and harnesses having identifying or ornamental means for pets and other animals. The present invention provides for a flexible belt member having at least one attachment to assist in securing the belt member about the animal. The belt member has a transparent face running along one side of the belt member to form an elongated pouch, and the face has a slotted aperture therein which opens into the pouch. A flexible strip lies in the pouch with identifying or ornamental indicia thereon which is visible through the transparent member of the belt. The strip may be inserted into or removed from the pouch to modify or change the indicia thereon.

The present invention also includes a kit for assembling a restraining device for animals utilizing a flexible belt with an elongated pouch therein and a transparent face along one side of the pouch. A flexible strip is adapted for insertion through a slotted aperture into the pouch. A plurality of indicia-bearing tabs are provided having adhesive along the back thereof for removable attachment to the flexible strip in any desired arrangement.

Using the foregoing invention, one may assemble an identifying or ornamental collar, leash or harness of his own choosing and may vary the indicia thereon at will. The strip is easily inserted and removed from the pouch and the numbers, letters, or ornamental indicia can be removed or rearranged with little effort. Moreover, the collar of the present invention fits snugly and smoothly about an animal's neck or other portion of the body without any unsightly or unwieldly protruberances which may be damaged or destroyed by the normal activities of the animal.

BRIEF DESCRIPTION OF THE DRAWINGS

The foregoing and other objects, features and advantages of the invention will be apparent from the following more particular description of embodiments of the invention, as illustrated in the accompanying drawings.

DETAILED DESCRIPTION OF THE DISCLOSURE

The present invention as illustrated and described concerns an animal collar, belt, harness or other restraining device adapted to encircle the body, neck or other limb of an animal such as a household pet. The band may be used for both identifying and decorating the animal and may be changed at will by the owner.

Figure 1:
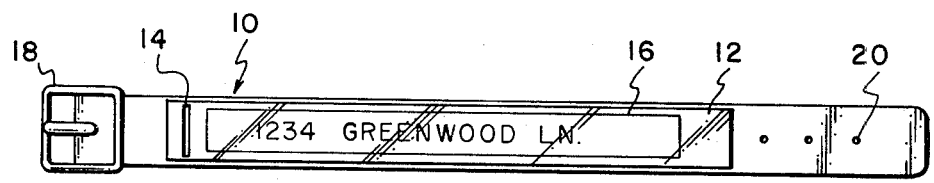
FIG. 1 is a top plan view of an animal collar embodying the present invention.

Referring to FIG. 1, a flexible belt or collar 10 in accordance with the present invention is shown. The belt includes a transparent face 12 attached about its periphery to the belt along the periphery of the transparent face and lying flush along the belt so as to form an elongated pouch therein. A slot-like aperture 14 runs transversely across the face of the transparent member, preferably at or near one end of the member. A flexible strip 16 lies loose within the pouch and bears identifying indicia such as shown in FIG. 1.

In a typical application, belt 10 is composed of leather or some other durable substance with transparent member 12 being of transparent plastic which is stitched or seamed to the belt. The flexible strip 16 is preferably also of plastic and has a surface texture to permit adherence of adhesive-backed tabs having indicia thereon. Preferably the strip surface and adhesive backing of the tabs will allow the tabs to be repeatedly removed and reapplied to the surface.

It is also preferable that the pouch formed by the transparent member 12 extend a substantial portion of the length of the belt 10 to maximize the space available for display of the name and address of the owner and pet.

Collar 10 includes some type of conventional attachment means such as a buckle 18 connected to one end of the belt. Suitable apertures 20 are provided at the opposite end of the belt for insertion of the buckle tongue in order to secure the belt about the animal. In some uses, belt 10 is preferably of an air-breathing substance, such as canvas, to prevent condensation in the pouch.

Figure 2:
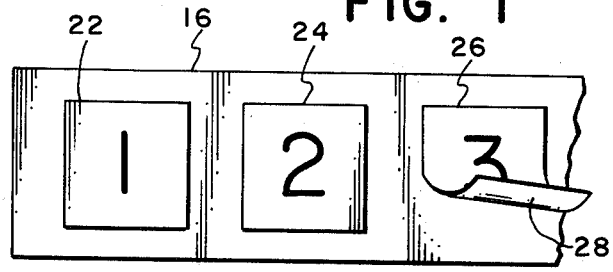
FIG. 2 is a top plan view, partially cut away, of a flexible strip of the present invention with indicia thereon.

Referring now to FIG. 2, the flexible strip 16 is shown in larger scale with indicia tabs 22, 24 and 26 thereon. Typically, the tabs are provided with an adhesive, preferably of a repeatably-adhering nature, on the backside 28 of the tabs so that the tabs may be secured and removed at will to the flexible strip 16. Preferably, the strips and tabs are available in assorted colors to match different dress needs.

Figure 3:
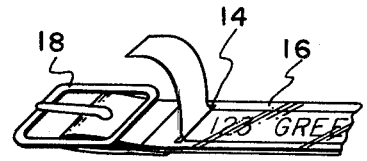
FIG. 3 is a partial perspective view of the collar of FIG. 1 showing insertion of the flexible strip of FIG. 2.

As shown in FIG. 3, after selection and adherence of the desired indicia-bearing tabs, the flexible strip is inserted through aperture 14 and worked along the pouch of belt 10 until the strip is entirely within the pouch. Preferably, the flexible strip 16 has sufficient body to allow the user to insert and work the strip along into the pouch by pushing the uninserted end of the strip.

Figure 4:
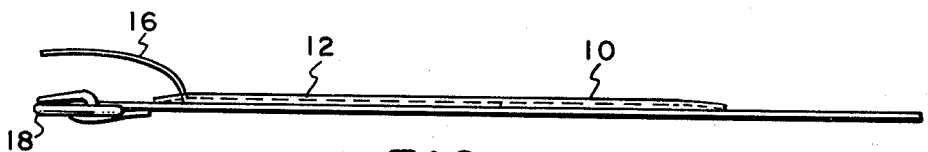
FIG. 4 is a side elevational view of the collar of FIG. 1 showing insertion of the flexible strip in accordance with FIG. 3.

FIG. 4 shows a side view of the same procedure. The flexible strip 16 must be inserted such that the indicia bearing face of the strip is located contiguous the transparent face 12 so that the indicia may be displayed therethrough.

Figure 5:
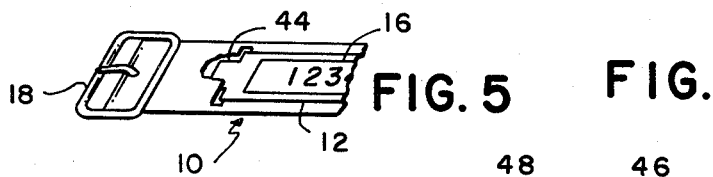
FIG. 5 is a partial perspective, partially cut-away view of the collar of FIG. 1 with a modification.

FIG. 5 shows a modification of transparent member 12 to include a tongue 44 which can be inserted into slot 14 to prevent strip 16 from inadvertently falling out of the slot.

Figure 6:
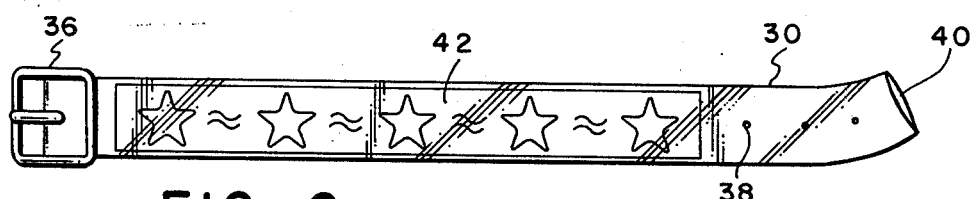
FIG. 6 is a top plan view of another embodiment of the animal collar of the present invention.

Looking now at FIG. 6, another preferred embodiment of the present invention is disclosed. In some instances it is preferable to utilize a single strip of transparent plastic for the entire collar in place of the leather collar with transparent attached face as shown above. This embodiment may be implemented by folding a long plastic strip 30 along its length and stitching or bonding the two ends 32 and 34 together along the length of the strip. A buckle 36 is then attached to one end of the strip, and matching holes 38 are provided at the opposite end.

Figure 7:
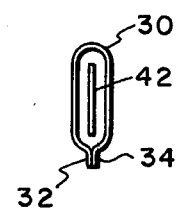
FIG. 7 is an end view of the collar of FIG. 6.

Preferably the end of the plastic strip is left open as best seen in FIG. 7. The desired flexible indicia-bearing strip 42 is then prepared and inserted in the end 40 of belt 30.

As an alternative, end 40 of the plastic belt 30 is sealed and an aperture is provided between buckle 36 and holes 38 (as in the FIG. 1 embodiment) so as to avoid working the strip 42 into the belt from end 40 sufficient to clear and not interfere with holes 38. Belt 30 may also be assembled by attaching a plastic strip to another strip of plastic or other material by heat stamping, glueing or stitching with nylon threads. As an alternative, one of several commercially available transparent plastic tubes may be utilized so that a seamed edge is not required.

Figure 8:
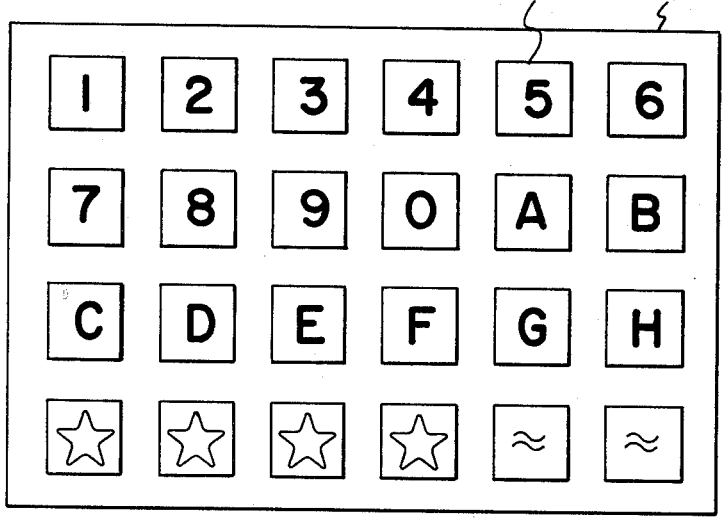
FIG. 8 is a top plan view of a sheet bearing indicia in accordance with the collar assembling kit of the present invention.

The indicia bearing tabs may be obtained by any conventional means. As shown in FIG. 8, a sheet 46 has a plurality of removable indicia-bearing tabs 48 thereon. The tabs may include any kind of numerical or alphabetic symbols or abstract and ornamental symbols. As an alternative, separate tabs may be used having separately removable protective backing.

The kit of the present invention preferably provides a belt such as belt 10 or belt 30 together with a flexible blank strip 16, 42 capable of receiving adhesive backed tabs. A sheet such as sheet 46 is provided and the desired tabs are removed and attached to the strip in any desired arrangement. The strip is then inserted through slot 14 as shown in FIGS. 3 and 4 until the strip is completely within the pouch. The collar is then encircled about the animal's neck and secured thereto.

It is understood that the foregoing embodiments are only exemplary of the present invention without limiting the scope thereof. Various obvious modifications and changes are contemplated as falling with the scope of the present invention. For example, although the disclosed embodiments are concerned with animal collars, the invention is likewise applicable to leashes, harnesses, belts and other restraining devices. Moreover, although the slot-like aperture is shown at or near the end of the collar, it may be placed at any point along the collar or on the opposite side thereof as desired. Means may also be provided for closing the aperture to seal the pouch of the collar against moisture and dirt.

The foregoing animal collar requires only very few parts and may be manufactured at a low cost. It provides the animal's owner with the means to assemble an animal collar having any desired combination of indicia thereon. Furthermore, the collar of the present invention facilitates varying and changing the identification and ornamentation used in connection with the collar. The collar, when assembled and secured to the animal, provides a smooth, continuous unit having no discontinuities or protruberances which might be subject to damage or wear.

While the invention has been illustrated and described in the foregoing embodiments, it is recognized that variations and changes may be made therein without departing from the invention claimed.

I claim:

1. A restraining device for animals comprising in combination:
   a flexible belt member having attachment means thereon for removably securing the belt member about said animal;
   said belt member having a transparent face along one side of the belt member lying substantially flush with the belt member and extending along most of the length of the belt member to form an elongated pouch said transparent face being attached about its periphery to said belt member and having a transverse slotted aperture in the transparent face near one end of the pouch opening into said pouch; and
   a flexible strip removably inserted in said pouch and extending substantially the entire length of the pouch, said strip having removable indicia along one face visible through the transparent face on said belt.

2. The combination of claim 1 wherein said belt member comprises an animal collar, and said attachment on the belt member comprises a buckle for joining the ends of the member together to secure said belt about the animal.

3. The combination of claim 1 wherein said belt member comprises a portion of an animal leash.

4. The combination of claim 1 wherein said transparent face comprises a plastic strip attached along one face of said belt member, said plastic strip having a transverse slot near one end to form the slotted aperture for receiving said flexible strip.

5. The combination of claim 1 wherein said belt comprises an elongated transparent unitary member having an elongated pouch therein, and said slotted aperture is formed by a transverse opening across said unitary member.

6. The combination of claim 5 wherein said unitary member comprises an integral plastic strip.

7. The combination of claim 1 wherein said flexible strip comprises a plastic strip member having one surface with removably attachable indicia thereon identifying said animal.

8. The combination of claim 1 wherein said flexible strip comprises a plastic strip member having one surface with removably attachable ornamental indicia thereon.

9. A kit for assembling a restraining device for animals comprising in combination:
- a flexible belt member having an attachment thereon for removably securing the belt member about the animal;
- said belt member having a transparent face along one side of the belt member lying substantially flush with the belt member and extending along most of the length of the belt member to form an elongated pouch said transparent face being attached about its periphery to said belt member and having a transverse slotted aperture near one end of the pouch opening into the pouch;
- a flexible elongated strip shaped for removable insertion through the slotted aperture into the pouch to extend substantially the entire length of the pouch and display one face of said strip along the transparent face; and
- a plurality of indicia-bearing tabs having adhesive on one side of each tab for removable attachment to the flexible strip in any desired order to provide identification or ornamentation for the collar.

10. A collar for animals comprising in combination:
- a flexible belt having an attachment at one end for removably securing the belt in a closed loop about a selected animal, said belt having sufficient strength to restrain the selected animal;
- said belt having a transparent strip lying substantially flush along one side of the belt and extending most of the length of the belt to form an elongated pouch said transparent strip being attached about its periphery to said belt member and having a slot running transversely across the strip near one end thereof to provide entry into the pouch; and
- a flexible strip lying in said pouch and extending a substantial portion of the length of the pouch, said flexible strip being adapted for removal and insertion through the transverse slot, said strip having indicia along one face contiguous with the transparent strip so as to be visible through the transparent strip of the belt.

* * * * *